United States Patent [19]

Illy

[11] 4,117,859
[45] Oct. 3, 1978

[54] VALVE

[75] Inventor: Alois Illy, Limburgerhof, Fed. Rep. of Germany

[73] Assignee: Klein, Schanzlin & Becker Aktiengesellschaft, Fed. Rep. of Germany

[21] Appl. No.: 783,651

[22] Filed: Apr. 1, 1977

[30] Foreign Application Priority Data

Aug. 4, 1976 [DE] Fed. Rep. of Germany ....... 2615236

[51] Int. Cl.² .................. F16K 31/122; F16K 31/524
[52] U.S. Cl. ..................................... 137/219; 251/252; 251/63.5; 251/342
[58] Field of Search ...................... 251/273, 334, 63.5, 251/252, 342; 137/219, 220

[56] References Cited

U.S. PATENT DOCUMENTS

| 1,477,722 | 12/1923 | Slattery | 137/219 |
| 2,278,313 | 3/1942 | Hornbostel | 137/219 X |
| 2,769,608 | 11/1956 | Renig | 251/342 |
| 3,322,138 | 5/1967 | Backman | 137/219 |
| 3,534,763 | 10/1970 | Lucardie | 137/219 |
| 3,540,462 | 11/1970 | Renzi | 137/219 |

FOREIGN PATENT DOCUMENTS 258,198 9/1926 United Kingdom ................ 251/63.5

Primary Examiner—Martin P. Schwadron
Assistant Examiner—A. Michael Chambers
Attorney, Agent, or Firm—Peter K. Kontler

[57] ABSTRACT

A valve with a tubular valve body having two axially deformable bellows disposed between two flanges and flanking an annular seat which is movable axially of the body to thereby change the effective cross-sectional area of an annular passage between its internal valve surface and the valving surface of a valve element which is secured to one of the flanges by several ribs and is spacedly surrounded by the body. The device or devices which serve to move the seat relative to the valve element are located outside of the body.

1 Claim, 5 Drawing Figures

VALVE

BACKGROUND OF THE INVENTION

The present invention relate to valves in general, and more particularly to improvements in valves of the type wherein a component is movable in the direction of fluid flow. Still more particularly, the invention relates to improvements in valves which can be utilized as shutoff valves and/or for regulation of fluid flow. Valves of the type to which the present invention pertains are also known as restrictors wherein the amount of restriction can be varied.

It is already known to install a piston-like valve element in the body of a valve and to provide actuating means for moving the valve element axially toward or away from a stationary valve seat in the body. The actuating means may be manipulated by hand, by remote control or automatically. In each instance, at least a portion of the actuating means must extend into the interior of the valve body in order to be coupled to the axially movable valve element. Reference may be had to German Pat. No. 473,538 which discloses a hollow cup-shaped valve element having a ring-shaped sealing member and being movable into and from engagement with an annular seat in the valve body. The means for actuating the valve element includes a shaft or spindle which is coaxial therewith and a bell crank lever having an inner arm which is articulately connected to the shaft, an outer arm which is accessible from without the valve body, and a median portion which is fulcrumed in the valve body.

A drawback of such conventional valves is that one or more portions of the actuating means for the axially movable valve element extend into the interior of the valve body. Such portions include bearings, pivot pins, guide means, parts of linkages and the like. Consequently, such portions of the actuating means are in permanent contact with the fluid. If the liquid is corrosive or contains one or more corrosive agents, it can shorten the useful life of the actuating means and/or necessitates frequent inspection, replacement or repairs. Moreover, and if the confined liquid is maintained at an elevated temperature, the external portion or portions of the actuating means must be thermally insulated from the internal portions so as to allow for manipulation by hand. Still further, the valve body must be provided with adequate seals to prevent leakage of fluid in regions where portions of the actuating means extend therethrough. This can present problems when the pressure of confined fluid is high. As a rule, the entire valve must be detached from the pipeline whenever a component part thereof necessitates inspection, replacement or repair.

SUMMARY OF THE INVENTION

An object of the invention is to provide a novel and improved valve wherein the means for moving a reciprocable or otherwise movable portion of the valve need not extend into the interior of the valve body so that all mobile parts of the valve are always accessible at the outside of the valve body.

Another object of the invention is to provide a valve wherein the valve body is and can remain hermetically sealed at all times, even in the event that the actuating means or other mobile parts of the valve must be detached from the remaining parts.

A further object of the invention is to provide an adjustable restrictor whose useful life is not as readily affected by corrosive or other aggressive fluids as the useful life of heretofore known valves.

An additional object of the invention is to provide a valve which can be installed in existing pipelines as a superior substitute for presently known shutoff of flow regulating valves.

An ancillary object of the invention is to provide a novel and improved valve actuating mechanism for moving a part which is provided with one valving surface relative to the part or parts which are provided with the other valving surface or surfaces.

The invention is embodied in a valve which comprises a valve body or housing having deformable first and second tubular sections (at least one of these sections may constitute a bellows which is deformable in the axial direction), a valve element which is disposed in the interior of and is spaced apart from the valve body so that the body and the valve element define an annular passage for the flow of a fluid (which may be a gaseous or a liquid medium), and an annular valve seat which is disposed between and is sealingly secured (e.g., welded or glued) to the tubular sections. The seat is movable axially of the passage (with attendant deformation of the tubular sections) and relative to the valve element to thereby change the effective cross-sectional area of the passage. It is presently preferred to mount the seat for movement to and from an end position in which its valving surface sealingly engages the valving surface of the valve element so that the valve can be used as a shutoff valve. The configuration of valving surfaces on the seat and on the valve element can be readily selected in such a way that the effective cross-sectional area of the annular passage changes in response to movement of the seat to a limited or infinite number of different positions.

The valve preferably further comprises suitable actuating means for moving the seat relative to the valve element. Such moving or actuating means may include a stationary cam which is secured to a rigid portion (e.g., a flange) of the valve body and a manually operable follower which tracks a helical or otherwise configurated face of the cam and is connected with the seat. Alternatively, the moving means may comprise a double-acting hydraulic or pneumatic cylinder which receives an annular piston of the seat. It is equally possible to resort to magnetic or electromagnetic moving means, or to a combination of two or more different types of moving means, e.g., one for manual actuation and another for automatic actuation or for actuation by remote control.

The valve element need not be movable in the valve body, even though it is possible to assemble such valve element of two portions one of which is movably coupled to the other portion, e.g., by means of a universal joint or a swivel joint, in order to insure that the valving surface of the seat can sealingly engage the valving surface of the one portion of the valve element when the seat is moved to its end position. For example, the valve element may be provided with one or more ribs which are fixed to or integral with a rigid portion of the valve body, such as an annular flange or the like which is sealingly secured to one of the deformable sections at that end of the one section which is remote from the movable seat.

Since the seat is sealingly secured to the deformable tubular sections of the valve body and such sections can be sealingly secured to other sections of the valve body or directly to the components of a pipeline, the interior of the valve body is always sealed from the surrounding area. Also, and since the means for moving the seat is mounted at the outside of the valve body, all repairs, inspections and/or replacements of moving means for the seat can be carried out without necessitating even temporary access to the interior of the valve body.

The novel features which are considered as characteristic of the invention are set forth in particular in the appended claims. The improved valve itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
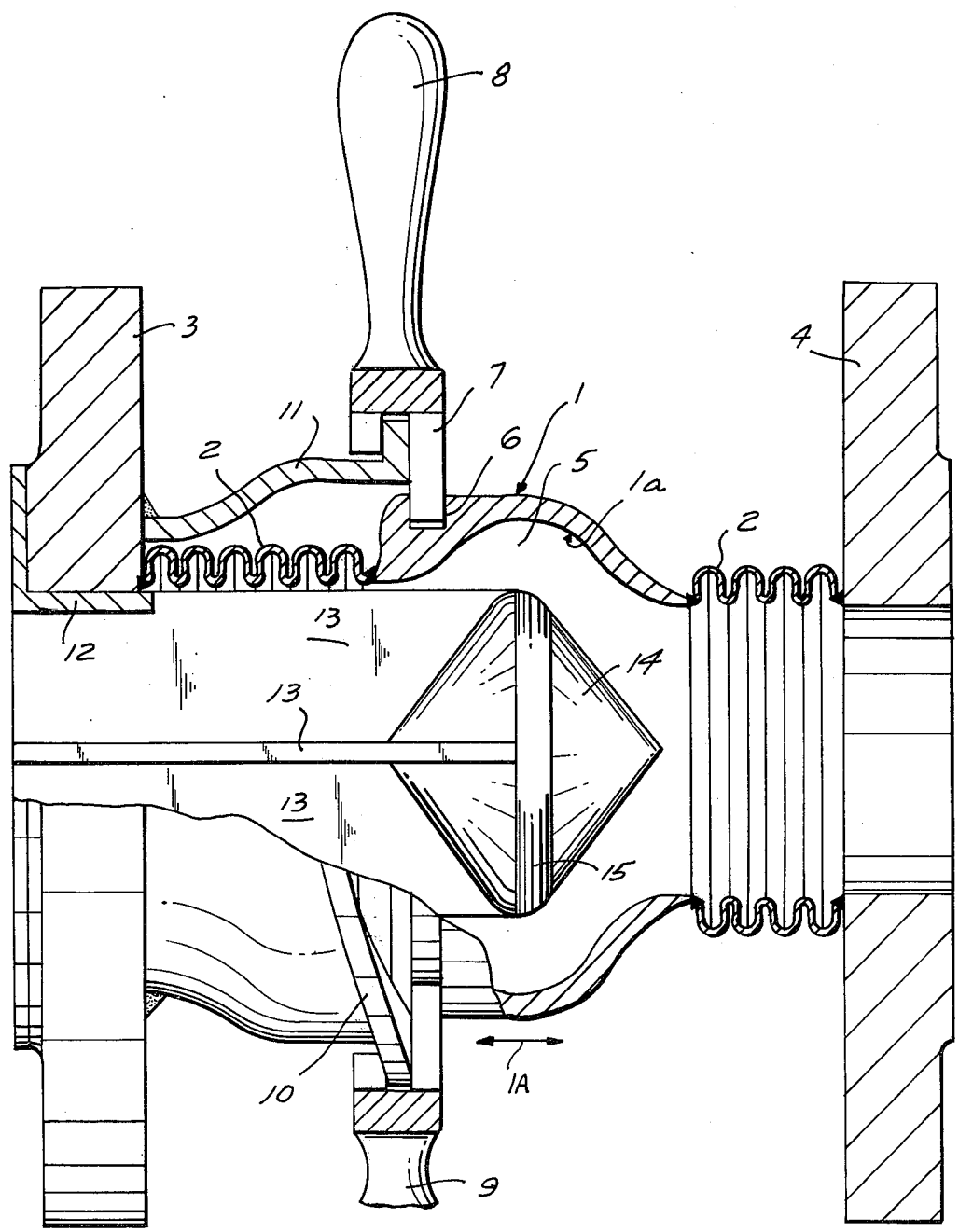
FIG. 1 is an axial sectional view of a valve which embodies one form of the invention.

Referring first to FIG. 1, there is shown a valve which comprises a valve body or housing including two spaced-apart coaxial deformable tubular sections 2 which consist of a suitable metallic material and whose outer ends are welded to two coaxial tubular members 3, 4 here shown as flanges constituting the end portions of the valve body. The inner end portions of the deformable sections 2 (each of which constitutes an axially deformable bellows) are welded to the respective ends of a metallic valve seat 1 having a suitably configurated valving surface 1a. It will be seen that the seat 1 constitutes a median portion of the valve body and is movable axially of the body in directions indicated by a double-headed arrow 1A. The movability of the seat 1 is attributed to deformability of the tubular sections 2.

The valve further comprises a conical valve element 14 which is installed in the valve body and defines therewith an annular passage 5 wherein the confined fluid can flow in a direction to the right or to the left. The valve element 14 is rigidly connected with the flange 3 by means of an annular insert 12 which is fitted into the axial bore of the flange 3 and is integral with or welded to four ribs 13 connected to or integral with the valve element 14. The valving surface of the element 14 is shown at 15. The manner in which the flanges 3 and 4 are sealingly secured to the adjacent portions of a pipeline or the like (not shown) forms no part of the invention.

The insert 12 can be omitted, i.e., the ribs 13 can be rigidly secured directly to the flange 3. Also, the number of ribs 13 can be reduced to less than four or increased to five or more. All that counts is to insure that the spaces between the ribs 13 provide sufficient room for the flow of a fluid from the passage 5 toward and through the bore of the flange 3 or vice versa.

The means for moving the annular seat 1 between a plurality of positions (including an end position in which the valving surface 1a sealingly engages the valving surface 15) comprises a cam 11 which surrounds the left-hand tubular section 2 and is welded to the flange 3. The cam 11 has a helical portion 10 which is tracked by a follower 7 here shown as a bifurcated member one prong of which engages the left-hand side of the helical portion 10 and the other prong of which extends into an external circumferential groove 6 of the seat 1. The follower 7 can be moved lengthwise of the helical portion 10 by a radially outwardly extending handle 8. If desired, the follower 7 can constitute a semicircular or ring-shaped body and may be provided with several handles. FIG. 1 shows a second handle 9 diametrically opposite the handle 8. The arrangement may be such that, when the handles 8 and 9 assume the positions shown in FIG. 1, the effective cross-sectional area of the passage 5 between the valve element 14 and the seat 1 is increased to the maximum value. The effective cross-sectional area of the passage 5 is reduced to zero (i.e., the valving surface 1a sealingly engages the valving surface 15) when the follower 7 is rotated through 90°, either clockwise or anticlockwise.

An advantage of the valve body which is shown in FIG. 1 is that the flanges 3 and 4 are not rigidly connected to each other. Therefore, the sections 2 of the valve body are deformed not only when the moving means is operated to change the axial position of the seat 1 but also to compensate for eventual changes in temperature, i.e., the distance between the flanges 3 or 4 can increase or decrease without affecting the operation of the valve and without unduly affecting the selected axial position of the seat 1. The sections 2 may but need not be elastically deformable; however, some elasticity is normally preferred because, if the expanded section 2 tends to contract or the shortened section 2 tends to expand, the follower 7 is biased against the helical portion 10 of the cam 11 at all times. This insures that the angular position of the follower 7 does not change except when one or both handles 8, 9 are grasped by hand and rotated in order to change the effective cross-sectional area of the passage 5.

If desired, the handles 8, 9 can be replaced with a wheel. Also, at least one of the tubular sections 2 can be replaced with a different deformable tubular section, e.g., by two tubes which are sealingly telescoped into each other, one of which is secured to the flange 3 or 4, and the other of which is secured to the seat 1. However, bellows or analogous one-piece deformable tubular sections are preferred at this time because they invariably prevent leakage of fluid from the interior of the valve body. It is further clear that at least some component parts of the improved valve can be made of non-metallic material, e.g., of suitable synthetic plastic material. Also, the internal surfaces of the valve body and seat 1 as well as the exposed surfaces of the insert 12, ribs 13 and valve element 14 can be coated with layers or films of corrosion- or heat-resistant material, depending on the nature of fluid which flows through the valve.

Figure 2:
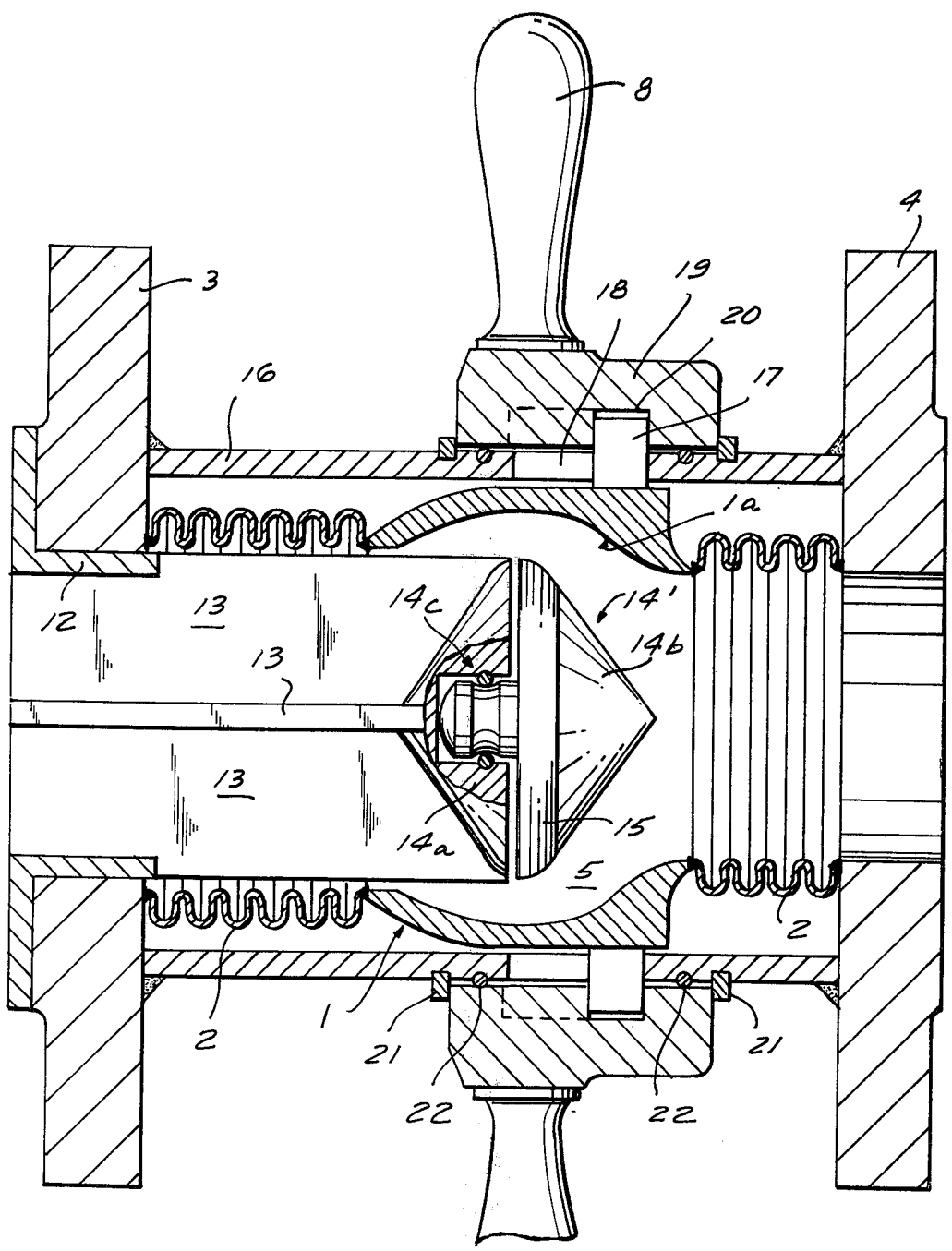
FIG. 2 is a similar axial sectional view of a modified valve.

FIG. 2 shows a modified valve wherein all such parts which are identical with or clearly analogous to corresponding parts of the valve of FIG. 1 are denoted by similar reference characters. The main difference between the two valves is that the valve element 14' of FIG. 2 comprises a first portion 14a which is rigid with the ribs 13 and a second portion 14b which is articulately connected to the portion 14a, by means of a simple universal joint 14c which allows the portion 14b to move axially of and/or to swivel relative to the portion 14a. This insures that the valving surfaces 1a and 15 are more likely to sealingly engage each other when the seat 1 is moved to the aforementioned end position. For example, the joint 14c amy comprise a relatively short stub or shank which extends with clearance into a complementary socket or blind bore of the portion 14a and has a circumferential groove which receives, also with some clearance, a split ring which is recessed into a groove provided in the surface bounding the socket. Such construction allows the portion 14b to move axially of as well as to pivot or swivel in all directions with respect to the portion 14a. Other types of joints (e.g., a ball-and-socket joint) can be used with equal advantage.

Another difference between the valves of FIGS. 1 and 2 is that the second valve comprises a rigid tubular member or sleeve 16 which is welded to the flanges 3, 4 and surrounds the deformable tubular sections 2 of the valve body as well as the axially movable seat 1. The sleeve 16 has one or more axially extending slots 18 for an equal number of radially outwardly extending projections or followers 17 which are rigid with the seat 1 and the outermost portions of which extend into the suitably configured internal helical groove 20 of a ring-shaped cam 19 rotatably mounted on the sleeve 16 and having one or more radially outwardly extending handles 8. The cam 19 can rotate about but cannot move axially of the sleeve 16 because it is confined between two split rings 21 or analogous stops recessed into circumferential grooves of the sleeve 16. If desired, the groove 20 can be sealed from the surrounding atmosphere as well as from the interior of the sleeve 16 by two O-rings or analogous sealing elements 22 which are interposed between the internal surface of the cam and the external surface of the sleeve at the opposite sides of the groove 20 and at opposite ends of the slots 18.

Figures 3, 3A:
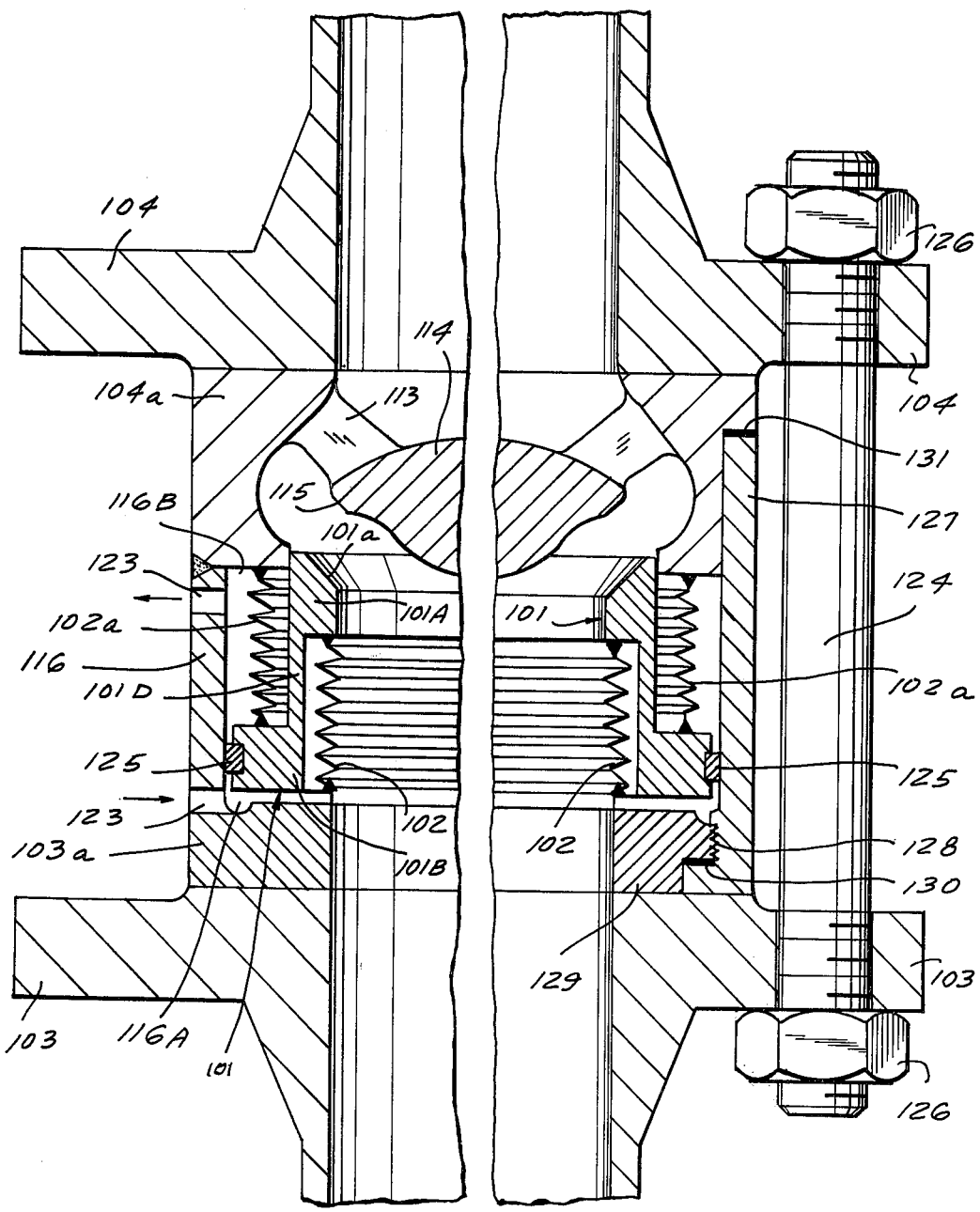
FIG. 3 is a fragmentary axial sectional view of a third valve.
FIG. 3a is a fragmentary axial sectional view of a modification of the valve which is shown in FIG. 3.

FIG. 3 shows a portion of a third valve whose body includes two spaced-apart coaxial flanges 103, 104 and two deformable tubular sections or bellows 102, 102a having different diameters. The inner section 102 is welded to the radially inwardly extending end portion 101A of the annular seat 101 and to a ring-shaped extension 103a of the flange 103. The outer section 102a is welded to a ring-shaped extension 104a of the flange 104 and to the radially outwardly extending end portion 101B of the seat 101. The latter has a valving surface 101a which engages the valving surface 115 of a valve element 114, which is rigidly connected to the extension 104a by ribs 113 (one shown in FIG. 3), when the seat 101 is moved to the upper end position, as viewed in FIG. 3. The cylindrical median portion of the seat 101 is shown at 101D.

The means for moving the seat 101 relative to the valve element 114 comprises a double-acting hydraulic or pneumatic cylinder 116 which surrounds the outer section 102a and is rigid with the extensions 103a, 104a. The ports of the cylinder 116 are shown at 123; these ports are disposed at the opposite sides of a piston ring 125 which is recessed into the end portion 101B of the seat 101. The end portion 101B can be said to constitute an annular piston of the seat 101.

An advantage of the valve of FIG. 3 is that its body is very short. This is due to the fact that the outer section 102a surrounds the inner section 102 in at least some positions of the seat 101 relative to the valve element 114. In the embodiment of FIG. 3, the section 102a always surrounds a portion of the section 102 and a portion of the seat 101. The means for admitting a hydraulic or pneumatic fluid into the chamber 116A or 116B of the cylinder 116 (while permitting the fluid to escape from the other chamber) is of conventional design and is not shown in FIG. 3. It is clear that the seat 101 or the seat 1 of FIGS. 1 or 2 can be moved by resorting to one or more magnets or electromagnets; for example, the seat can carry one or more armatures which form part of electromagnets. When the electromagnet or electromagnets are energized, the seat moves in one direction, and the seat moves in the opposite direction under the action of the deformable sections of the valve body or in response to the bias of discrete springs when the electromagnet or electromagnets are deenergized. It is also possible to provide one or more electromagnets which can be energized to move the seat in one direction, and one or more additional electromagnets which can be energized to move the seat in the opposite direction.

If the cylinder 116 is not welded or otherwise rigidly secured to the extensions 103a, 104a, the structure of FIG. 3 may comprise a set of tie rods which couple the flanges 103, 104 to each other.

FIG. 3a shows a modification of the valve of FIG. 3. The double-acting cylinder 116 of FIG. 3 is replaced with a detachable double-acting cylinder 127 (the ports of this cylinder are not shown) which has an internal thread 128 meshing with the external thread of a ring 129 which replaces the extension 103a of FIG. 3. When the tie rods 124 and their nuts 126 are removed, the flange 103 can be detached and the cylinder 127 is thereupon accessible for detachment from the ring 129. This exposes the piston ring 125 for inspection or replacement. The reference characters 130, 131 denote deformable annular sealing elements at the respective end faces of the cylinder 127. The seat 101 of FIG. 3a is identical with or similar to the seat of the valve shown in FIG. 3.

The moving means for the valve element 101 of FIGS. 3 or 3a is especially suited for automatic operation or for operation by remote control.

Figure 4:
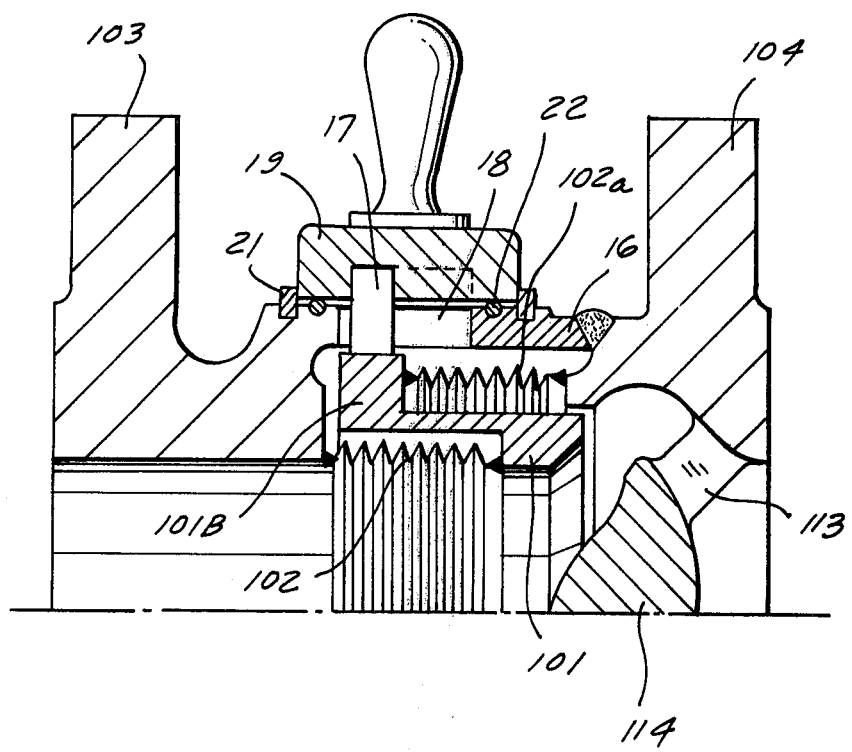
FIG. 4 is a fragmentary axial sectional view of still another valve.

FIG. 4 shows a portion of a valve which embodies the features of the valves shown in FIGS. 2 and 3. Thus, the seat 101 and the deformable sections 102, 102a of the valve body are similar to those shown in FIG. 3 but the means for moving the seat 101 relative to the valve element 114 (which is rigid or integral with the flange 104) includes a cam 19, a relatively short sleeve 16 with one or more slots 18, and a follower 17 which is rigid or integral with the end portion 101B of the seat 101. The split rings are shown at 21 and the sealing elements at 22.

The valve of FIG. 4 exhibits the same advantage as the valve of FIGS. 3 or 3a, i.e., its body is very short because one of the deformable sections 102, 102a surrounds the other section.

Each embodiment of the improved valve exhibits the advantage that there is no need to provide mobile parts which extend into the interior of the valve body, i.e., all mobile parts (with the exception of the axially movable seat which can be said to form part of the valve body) are installed outside of the valve body and are always accessible for inspection, replacement and repair. Moreover, the number of sealing devices can be reduced to a minimum since all component parts of the means for moving the seat are mounted without the valve body and the valve element is rigidly installed in the interior of the body. Still further, the improved valve need not be provided with pivots, bell crank levers and analogous parts which are necessary in the aforedescribed conventional valves. All this contributes to longer useful life and to lower initial and maintenance cost of the improved valve. Also, the likelihood of uncontrolled escape of fluid from the interior of the valve body or of penetration of atmospheric air or other fluid which surrounds the valve into the interior of the body is practically non-existent.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A valve comprising a body including deformable first and second tubular sections; a valve element disposed in the interior of and spaced apart from said body so that said body and said element define an annular passage for the flow of fluid; and an annular valve seat disposed between and sealingly secured to said tubular sections, said seat being movable axially of said passage with attendant deformation of said sections and relative to said element to thereby change the effective cross-sectional area of said passage; means for moving said seat relative to said valve element, said moving means comprising a helical cam located outside of said body, a follower coupled to said seat and arranged to track said cam, means for moving said follower relative to said cam, said seat having an external circumferential groove and said follower having a portion extending into said groove, and said helical cam, said groove and said follower being positioned so that the said deformable first and second tubular sections are permitted to shift due to conditions other than the operation of the valve, such as temperature change, without affecting operation of the valve and the selected axial position of the seat since the follower will be biased against the helical cam at the same time and the angular position of the follower will not change.

* * * * *